Patented Oct. 5, 1954

2,691,043

UNITED STATES PATENT OFFICE 2,691,043

FLUORINATED AMINES

Donald R. Husted, St. Paul, and Arthur H. Ahlbrecht, White Bear Township, Ramsey County, Minn., assignors to Minnesota Mining & Manufacturing Company, St. Paul, Minn., a corporation of Delaware No Drawing. Application March 13, 1950, Serial No. 149,458

7 Claims. (Cl. 260—583)

This invention relates to our discovery of a new and useful group of reactive fluorocarbon compounds having novel properties and useful as chemical intermediates, and to a method of making such compounds.

The novel compounds claimed herein are the 1,1 - dihydroperfluoroalkylamines, wherein the molecule contains a non-cyclic saturated fluorocarbon chain (normal or branched) having at least three carbon atoms, which is joined to a reactive aminomethyl group ($-CH_2NH_2$) having a carbon atom to which two hydrogen atoms are bonded. The general formula is:

$$C_nF_{2n+1}CH_2NH_2$$

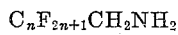

where $n$ has a value of 3 to 12 in defining our compounds claimed herein. The invention also includes the salts and the N-substituted amide derivatives of these amines.

The first member of the complete series of amines represented by the above general formula, $CF_3CH_2NH_2$, was prepared some years ago by A. F. Benning and J. D. Park, U. S. Patent No. 2,348,321 (May 9, 1944), and by H. Gilman and R. G. Jones, Journal of the American Chemical Society, vol. 65, p. 1458 (1943); but so far as we are aware neither the second nor the higher members of that series have heretofore been discovered or characterized.

We have found that the amine compounds which contain three or more carbon atoms in the fluorocarbon chain (i. e. those containing a total of four or more carbon atoms in the molecule) have distinctive properties not possessed by the first member of the series. The presence of a substantial fluorocarbon chain in the molecule, as contrasted with a single fluorinated carbon atom, is responsible for the development of new characteristics. Furthermore, our compounds also differ from the second member of the series, $CF_3CF_2CH_2NH_2$, in significant respects, quite apart from expected differences.

A striking physical difference is that our compounds have boiling points which are substantially lower than those of the corresponding non-fluorinated hydrocarbon amines containing the same number of carbon atoms. This is not true of the first two members of the series. Thus in his above-cited paper, Gilman makes a special point of the fact that $CF_3CH_2NH_2$ boils at 37° C. which is 21° higher than the boiling point of $C_2H_5NH_2$. In contrast, $C_3F_7CH_2NH_2$ boils at 63° C., which is 10° lower than the boiling point of $C_4H_9NH_2$.

One striking chemical difference which readily distinguishes our novel amine compounds from the first and second members of the series is the fact that the latter react with dilute sulfuric acid to form sulfates which are soluble in dilute sulfuric acid, whereas our compounds react to form insoluble sulfates. Also, the latter form hydrochloride salts which are readily water-soluble, whereas the hydrochloride salts of our compounds are insoluble in water or only sparingly soluble.

The linking of the nitrogen atom to the fluorocarbon chain by a methylene group enhances stability, reactivity and solubility. On the other hand, the linking of a saturated fluorocarbon chain to this same methylene group, thereby providing the molecule with a fluorocarbon "tail" which is both hydrophobic and oleophobic at normal temperatures, results in the molecule having unique properties which it would not have if this chain were a hydrocarbon chain or even a partially fluorinated chain. Saturated fluorocarbons are highly inert and stable.

These fluorinated alkyl amine compounds undergo diazotization to form the corresponding diazo compounds, which can be isolated in pure form by distillation and which are relatively stable. The ability to form stable diazo compounds is in contrast to the inability of the hydrocarbon alkyl amines to form stable diazo compounds.

These amine compounds are soluble in ether and can be reacted in ether solution with strong acids (those stronger than acetic acid) to form solid salts which are insoluble in ether. Use can be made of the various strong acids which are known to react with hydrocarbon alkyl primary amines to form salts.

These amine compounds react with anhydrides of monocarboxylic acids, RCOOH (even with acetic anhydride), to form N-substituted amides having the general formula: $RCONHCH_2C_nF_{2n+1}$, where "RCO" is the acyl radical of the acid that has replaced one of the N-bonded hydrogen atoms of the amine.

Our amine compounds and their salts and amides have value as chemical intermediates for the making of other compounds and it is a particular advantage that they contain a polycarbon fluorocarbon chain so as to be able to introduce such a chain into derivative compounds of various desired kinds. The presence of such a polycarbon fluorocarbon chain, containing three or more carbon atoms, is desirable in many compounds because it imparts properties not obtainable with a $-CF_3$ or even with a $-C_2F_5$ group. For example, the longer fluorocarbon chains have a marked effect on surface active properties and are often needed in order to obtain desired characteristics.

While, as previously indicated, the 1,1-dihydroperfluoroalkylamines of our invention, and the $CF_3CH_2NH_2$ amine compound of the prior art, can be represented by a common generic formula, and in this sense may be regarded as being members of the common series defined by that formula, this circumstance does not of itself imply that they behave similarly. In our compounds the majority of carbon atoms are fluorinated and the molecules have a fluorocarbon "tail" consisting of at least three fully fluorinated carbon atoms directly united to the aminomethyl group ($-CH_2NH_2$), the incremental unit being a fluorocarbon $-CF_2-$ group; and our compounds have unique properties in consequence of this structure and composition. The prior art $CF_3CH_2NH_2$ compound is the first member of a normal homologous series wherein the incremental unit is a hydrocarbon $-CH_2-$ group, represented by the formula: $CF_3(CH_2)_mNH_2$; a series characterized by the fact that the molecules have a terminal trifluoromethyl group ($CF_3-$) which is linked to a terminal amino group ($-NH_2$) by one or more interposed methylene groups ($-CH_2-$). This is the true homologous series according to classical organic chemistry and is the one that is taught in the previously mentioned patent of Benning and Park (No. 2,348,321), which indicates that the next higher members of this true homologous series resemble the $CF_3CH_2NH_2$ compound.

Our new compounds are colorless liquids or solids at room temperature. The first member of this group of amine compounds is:

1,1-dihydroheptafluorobutylamine having the formula:

$C_3F_7CH_2NH_2$

This compound is liquid at room temperature and has a boiling point of about 68° C. (at 740 mm.). It boils at about 34° C. at 180 mm. pressure, and at about 24° C. at 115 mm. Its density is 1.493 (grams/cc. at 20° C.) and its refractive index is 1.298 ($nD/20$). It is sparingly water-soluble (solubility of less than 3% by weight at 20° C., determined by titration). It is hygroscopic. Traces of water can be removed by distillation from freshly calcined calcium oxide. It forms a precipitate in dilute sulfuric acid (in the presence and in the absence of lithium and aluminum salts), but dissolves completely in concentrated sulfuric acid and does not reprecipitate on dilution with water. It can be converted to an isocyanate by reaction with phosgene.

It reacts in ether solution with anhydrous hydrogen chloride to form a pure hydrochloride salt precipitate, $C_3F_7CH_2NH_2 \cdot HCl$, an ether-insoluble, white, solid compound, which sublimes at about 130–135° C., and which is moderately soluble in water (solubility of approximately 20%). It reacts in ether solution with sulfuric acid to form a pure bisulfate salt precipitate, $C_3F_7CH_2NH_2 \cdot H_2SO_4$ an ether-insoluble, white, solid compound, which decomposes when heated to about 105–120° C., and which is sparingly water-soluble (solubility less than 3%). The bisulfate formation shows that this fluorinated amine is less basic than the corresponding nonfluorinated hydrocarbon amine. The following table gives data on the most prominent lines of the Debye Scherrer X-ray fine powder patterns (CuKα) of these salt compounds:

| | $C_3F_7CH_2NH_2 \cdot HCl$ | | $C_3F_7CH_2NH_2 \cdot H_2SO_4$ | |
|---|---|---|---|---|
| | I | d Å. | I | d Å. |
| (I) | VS | 4.76 | VS | 4.83 |
| (II) | S | 5.25 | S | 5.36 |
| (III) | S | 2.60 | S | 4.26 |
| (IV) | | | VS | 3.63 |

This amine compound reacts in ether solution with fluorocarbon carboxylic acids to form ether-insoluble fluorocarbon salts. For instance, it reacts with heptafluorobutyric acid ($C_3F_7COOH$) to form the heptafluorobutyrate salt $C_3F_7CH_2NH_2 \cdot C_3F_7COOH$ a white solid which melts at 136–137° C. and is insoluble in ether but soluble in water. Other examples of such fluorocarbon acids are trifluoroacetic acid, pentafluoropropionic acid, and the higher members of the series. These are all strong acids. The partially halogenated organic acids are also sufficiently strong to form acid salts.

Acetic acid ($CH_3COOH$) is not sufficiently strong to form a solid salt with $C_3F_7CH_2NH_2$, which further illustrates the fact that this fluorinated amine is less basic than the corresponding non-fluorinated hydrocarbon amine.

This amine compound reacts with the anhydrides of the monocarboxylic acids to form N-substituted amides having the general formula $RCONHCH_2C_nF_{2n+1}$. For instance, it reacts with heptafluorobutyric anhydride to form N-(1,1-dihydroheptafluorobutyl) heptafluorobutyramide, $C_3F_7CONHCH_2C_3F_7$; a water-insoluble white solid which melts at 63–64° C., and is soluble in hot carbon tetrachloride but not in cold. It reacts with acetic anhydride to form N-(1,1-dihydroheptafluorobutyl) acetamide, $CH_3CONHCH_2C_3F_7$ a water-insoluble white solid which melts at 51–52° C., and is soluble in hot carbon tetrachloride but not in cold.

The compound:

1,1-dihydrotridecafluoroheptylamine having the formula:

$C_6F_{13}CH_2NH_2$ is liquid at room temperature and has a boiling point (micro) of about 129° C. (at 740 mm.). Its density is 1.624 (grams/cc. at 20° C.) and its refractive index is 1.309 ($nD/20$). It is insoluble in water. The hydrochloride salt, which is relatively insoluble in water, sublimes in high vacuum at 65° C. ($10^{-5}$ mm.). This amine reacts in ether solution with sulfuric acid to form the normal sulfate, $(C_6F_{13}CH_2NH_2)_2 \cdot H_2SO_4$, which is insoluble in dilute sulfuric acid.

The compound:

1,1-dihydrononadecafluorodecylamine having the formula:

$C_9F_{19}CH_2NH_2$ is a low-melting solid material, having a melting point of about 48° C. and a boiling point (micro) of about 183° C. (at 740 mm.). It sublimes in high vacuum at 50–65° C. ($10^{-5}$ mm.). It is insoluble in water. The hydrochloride salt is insoluble in water, and melts with sublimation at a temperature somewhat above 200° C. when heated in a sealed tube, and sublimes in high vacuum at 65–100° C. ($10^{-5}$ mm.). This amine reacts in ether solution with sulfuric acid to form the normal sulfate, which is insoluble in dilute sulfuric acid. The three most prominent Debye Scherrer lines of the hydrochloride salt are: I. 4.88 VVS; II. 16.5 VS; III. 5.43 MS.

The following table lists the approximate boiling points (at 740 mm.) of the normal amine compounds of this invention in the range of 3 to 12 carbon atoms in the fluorocarbon chain.

| Compound: | B. P. (° C.) |
|---|---|
| $C_3F_7CH_2NH_2$ | 68 |
| $C_4F_9CH_2NH_2$ | 87 |
| $C_5F_{11}CH_2NH_2$ | 107 |
| $C_6F_{13}CH_2NH_2$ | 129 |
| $C_7F_{15}CH_2NH_2$ | 146 |
| $C_8F_{17}CH_2NH_2$ | 165 |
| $C_9F_{19}CH_2NH_2$ | 183 |
| $C_{10}F_{21}CH_2NH_2$ | 200 |
| $C_{11}F_{23}CH_2NH_2$ | 218 |
| $C_{12}F_{25}CH_2NH_2$ | 235 |

METHOD OF MAKING

We have discovered that our amine compounds can be conveniently prepared by reduction of the corresponding fluorocarbon amide compounds in dry ether solution under an inert atmosphere, using lithium aluminum hydride, $LiAlH_4$; the over-all result of the process being to convert the $-CONH_2$ amide group to a $-CH_2NH_2$ aminomethyl group to result in the amine product compound. Thus, for example, 1,1-dihydro-heptafluorobutylamine, having the formula $$C_3F_7CH_2NH_2$$

can be made from heptafluorobutyramide, having the formula $C_3F_7CONH_2$.

The amine compounds claimed herein, having three or more carbon atoms in the fluorocarbon chain, can be easily recovered from the reaction mixture in the ether solution by utilizing sulfuric acid which reacts to form an insoluble sulfate salt of the amine (or by utilizing hydrochloric acid which reacts to form an insoluble hydrochloride salt of the amine), filtering out the amine salt precipitate and drying, and treating the solid with a concentrated solution of alkali to release the amine product compound which can be distilled out and recovered by condensation. The crude amine compound can be further purified by distillation. In the case of the $C_3F_7CH_2NH_2$ product, it will contain a few percent of water, which can be removed by mixing the amine with freshly calcined calcium oxide and distilling off the anhydrous amine compound. The higher members of the series are water-insoluble but may contain traces of water and can likewise be dehydrated if desired. The following experimental examples illustrate the process.

Example 1

This example relates specifically to the preparation of $C_3F_7CH_2NH_2$ but the procedure can also be employed in making higher members of the series.

The reaction apparatus was a dry 3000 ml. 3-necked glass flask equipped with a stirrer, a water-cooled reflux condenser, a dropping funnel, and a gas inlet tube so that dry nitrogen could be flowed through the system. The apparatus was dried at 120° C. before use, and assembled while still hot with dry oxygen-free nitrogen passing through the apparatus.

(*Warning.*—Precautions must be observed in using the lithium aluminum hydride reduction agent. It is sensitive to $H_2O$ and $CO_2$ in the air, is spontaneously inflammable with water, and inflames on rubbing unprotected in a mortar. It should be ground in a mortar under a nitrogen atmosphere, and should be added rapidly to the flask with a slow nitrogen stream flowing through the system. In case of a fire, do not use a water or carbon dioxide fire extinguisher. Use nitrogen or dry sodium chloride as an extinguisher.)

With nitrogen flowing through the system (a flow of 0.1 to 0.2 cubic foot per hour is sufficient during the reaction), the flask was charged with 1200 ml. of dry diethyl ether and then with 44.6 grams (1.172 mols) of powdered $LiAlH_4$. The suspension was stirred until the $LiAlH_4$ had dissolved, leaving only a slight haze of insoluble impurities in suspension. Two hours of stirring is usually sufficient.

To the solution was added dropwise 100 grams (0.469 mol) of heptafluorobutyramide $$C_3F_7CONH_2$$

dissolved in dry diethyl ether, the addition being made slowly enough to maintain a gentle reflux while the reaction flask was cooled in an ice bath. The stirring was continued for two hours with cooling, and then for a further period of 2½ hours (without cooling being employed) with gentle reflux taking place.

At the end of the reflux period the flask was cooled with an ice-salt mixture. The nitrogen flow was increased to 2 cu. ft./hr. Water was added dropwise until hydrogen was no longer evolved, so as to decompose the excess $LiAlH_4$, and a few ml. additional water was added as a safety measure. (Nitrogen must be flowing through the apparatus during the addition of the water as otherwise there is considerable danger of fire. The water inlet tube should extend almost to the level of the ether so that no water strikes the side of the flask where a film of unreacted $LiAlH_4$ may have collected.)

With continued cooling of the flask, addition was made of an ice-cold solution of 260 ml. (4.9 mols) of concentrated sulfuric acid in 1000 ml. of water. This resulted in the formation of an insoluble bisulfate salt of the amine, precipitated by the excess of sulfuric acid. This was removed by filtration and dried in an oven at 100° C.

The dried salt was ground in a mortar to a fine powder and placed in a 500 ml. 3-necked flask equipped with a dropping funnel, stirrer, and distilling head. A 50% solution of sodium hydroxide (about 4 mols) was added until the resulting solution became basic (pH of 11 by Hydrion paper). The crude amine was distilled out on heating (B. P. 60–65° C.), and was then redistilled through a 6–8 plate fractionating column and the fraction distilling at 65–66° C. (at about 736–740 mm. pressure) was collected. The yield was about 45 grams (50%).

The product contained about 2–3% water and was dehydrated by distillation from freshly calcined calcium oxide. The resultant pure amine, $C_3F_7CH_2NH_2$, had the properties previously mentioned. It was also identified by analysis and by determination of molecular weight.

The mother liquors remaining in the reaction flask after removal of the amine bisulfate precipitate contain other reduction products of value which can be recovered. If the ether has not all evaporated, the two layers are separated. The aqueous layer is extracted three more times with ether. The combined ether solution from the mother liquor and the ether extracts is frozen to remove water, and the supernatant liquid is poured off. The ether is then removed in a stripping still. The residual liquid is dried with a small amount of anhydrous calcium sulfate ("Drierite") and redistilled through a 10–15 plate micro-fractionating column. The fractions boiling higher than the amine are mixtures containing, among other things, heptafluorobutyric acid, $C_3F_7COOH$, and heptafluorobutyraldehyde hydrate, $C_3F_7CH(OH)_2$. The latter has a boiling point of about 93° C. It can be converted to the aldehyde, $C_3F_7CHO$, by dehydration, using a drying agent such as concentrated sulfuric acid or phosphorous pentoxide. The fluorocarbon aldehydes and their hydrates (aldehydrols) are more fully described, and are claimed, in our copending application S. N. 120,008, filed on October 6, 1949, and since issued as Patent No. 2,568,500 on September 18, 1951.

For making 1,1-dihydropentafluoropropylamine, $C_2F_5CH_2NH_2$, from the corresponding amide, $C_2F_5CONH_2$, the foregoing procedure can be utilized in modified form as follows: Extract the sulfuric acid solution with ether (to remove the aldehyde hydrate by-product). Make the aqueous solution basic, then extract this basic solution with ether. Add anhydrous hydrogen chloride to the last-mentioned ether extract to precipitate the amine in the form of the hydrochloride salt, filter out the latter, dry and treat with concentrated sodium hydroxide solution to release the amine, and recover the amine by distillation. The crude amine is then purified by fractional distillation and dehydration.

Proceeding in this manner, we have prepared the $C_2F_5CH_2NH_2$ compound and have found that it has a boiling point of about 49° C. at 740 mm., a density of 1.400 (grams/cc. at 20° C.), and a refractive index of 1.297 ($nD/20$).

We have also used the $LiAlH_4$ reduction process for preparing $CF_3CH_2NH_2$, which has a boiling point of about 37° C. (at 740 mm.), using $CF_3CONH_2$ as the starting compound. In this case it was found desirable to employ tetrahydrofuran instead of ether as the reaction medium. Water was added to the reaction mixture and the amine was recovered from the resultant basic solution by distillation.

*Example 2*

This example illustrates the preparation of $C_9F_{19}CH_2NH_2$.

A dry 1000 ml. flask, equipped as described in the preceding example, was used as the reaction vessel, and the same precautions as to nitrogen flow, and otherwise, were observed during the course of the reaction procedures.

To the flask was added 200 ml. of dry diethyl ether and 5.5 grams (0.146 mol) of powdered $LiAlH_4$, and the suspension was stirred until the latter had dissolved. Then addition was made of 25 grams (0.0486 mol) of normal nonadecafluorocapric amide ($C_9H_{19}CONH_2$) suspended in 200 ml. of dry diethyl ether. The insoluble portion of the amide was washed in with successive portions of dry ether. The addition was made slowly enough to maintain only gentle reflux while the reaction flask was cooled in an ice bath. The stirring was continued for 2 hours with cooling and for 2½ hours longer at gentle reflux. At the end of the reflux period the flask was cooled with an ice-salt mixture and water was added dropwise until hydrogen was no longer evolved, and then a few ml. of additional water was added as a safety measure.

With continued cooling, 100 ml. of ice-cold concentrated hydrochloric acid was added, which served to precipitate the hydrochloride salt of the amine reaction product, which was insoluble in the excess acid. The precipitate was removed by filtration, dried, and sublimed in a high vacuum at about 65–100° C. ($10^{-5}$ mm. pressure). The product was a white crystalline solid.

This was placed in a small distilling flask with an excess of 50% aqueous sodium hydroxide solution (about 5 ml., 0.06 mol sodium hydroxide), and slowly distilled. The amine passed over with the steam and partly solidified. It was extracted with ether. The amine was recovered by evaporating the ether and was purified by distilling in high vacuum. The pure amine ($C_9F_{19}CH_2NH_2$) has a melting point of about 48° C. and a boiling point (micro) of about 183° C. (at 740 mm.).

PREPARATION OF FLUOROCARBON AMIDES

The fluorocarbon amides, having the formula $C_nF_{2n+1}CONH_2$, utilized as starting compounds for making the dihydroperfluoroamines by the method described above, can be prepared by ammonolysis of the corresponding fluorocarbon acid fluorides, having the formula $C_nF_{2n+1}COF$.

The fluorocarbon acid fluorides can be made by electrolyzing a solution of anhydrous liquid hydrogen fluoride containing a dissolved hydrocarbon monocarboxylic acid ($C_nH_{2n+1}COOH$) of corresponding carbon skeletal structure, or its anhydride, by passing direct current through the solution at a cell voltage which is insufficient to generate molecular (free elemental) fluorine under the existing conditions, but which is sufficient to cause the formation of the fully fluorinated acid fluoride at a useful rate. The latter is relatively insoluble in the electrolyte solution and either settles to the bottom of the cell from which it can be drained with other fluorocarbon products of the process, or is volatilized and evolves from the cell in admixture with the hydrogen and other gaseous products. Reaction of the acid fluoride with ammonia produces the amide, a solid compound which can readily be separated and purified.

A simple electrolytic cell can be used, having steel cathodes and nickel anodes, operated at about 0° C. and atmospheric pressure, the applied cell voltage being about 5–6 volts D. C.

The fluorocarbon amides can also be conveniently prepared by reacting the corresponding alkyl esters with ammonia.

The electrochemical process is described and claimed in the copending application of J. H. Simons, S. N. 62,496, filed November 29, 1948, and since issued as Patent No. 2,519,983 on August 22, 1950. Fluorocarbon acid fluorides, amides, acids, and alkyl esters of fluorocarbon acids, are described and claimed in the copending application of A. H. Diesslin, E. A. Kauck and J. H. Simons, S. N. 70,154, filed January 10, 1949, and since issued as Patent No. 2,567,011 on September 4, 1951, which also described the electrochemical process. Heptafluorobutyric acid and various of its derivatives (including the acid fluoride, the amide, and alkyl esters) have been described in a brochure published by Minnesota Mining & Manufacturing Company (St. Paul, Minnesota) in October 1949, as advertised in Chemical and Engineering News, issue of October 17, 1949, at page 3061.

The N-substituted amide derivatives of our 1,1-dihydroperfluoroalkylamine compounds, namely, the N-(1,1-dihydroperfluoroalkyl) acylamide derivatives, are described more fully and are claimed in our continuation-in-part application S. N. 408,995, filed February 8, 1954.

What we claim is as follows:

1. The compounds of the class consisting of the 1,1-dihydroperfluoroalkylamines represented by the formula $C_nF_{2n+1}CH_2NH_2$, where $n$ has an integer value of 3 to 12, and their acid salts.

2. The compound of 1,1-dihydroheptafluorobutylamine, having the formula $C_3F_7CH_2NH_2$.

3. The compound 1,1-dihydrononafluoroamylamine, having the formula $C_4F_9CH_2NH_2$.

4. The compound 1,1-dihydroundecafluorohexylamine, having the formula $C_5F_{11}CH_2NH_2$.

5. The compound 1,1-dihydropentadecafluorooctylamine, having the formula $C_7F_{15}CH_2NH_2$.

6. The compound 1,1-dihydrononadecafluorodecylamine, having the formula $C_9F_{19}CH_2NH_2$.

7. The method which comprises reducing with LiAlH$_4$, in dry ether solution and under an inert atmosphere, a fluorocarbon amide compound having the formula $C_nF_{2n+1}CONH_2$, where $n$ has a value of 3 to 12, so as to produce the corresponding 1,1-dihydroperfluoroalkylamine compound, having the formula $C_nF_{2n+1}CH_2NH_2$, eliminating any unreacted LiAlH$_4$, reacting the amine product in the ether reaction mixture with an excess of an acid of the class consisting of hydrochloric acid and sulfuric acid, to form an insoluble amine salt precipitate, and recovering the latter.

References Cited in the file of this patent

UNITED STATES PATENTS

| Number | Name | Date |
|---|---|---|
| 2,559,752 | Berry | July 10, 1951 |

OTHER REFERENCES

Gilman et al.: J. A. C. S., vol. 65, p. 1458 (1943).

Nystrom et al.: J. A. C. S., vol. 70, pp. 3738–3740 (1948).

McBee et al.: Ind. and Eng. Chem., vol. 39, pp. 415–417 (1947).